May 2, 1950 A. WITTLIN 2,506,286
MANUAL COUPLER
Filed Oct. 25, 1947
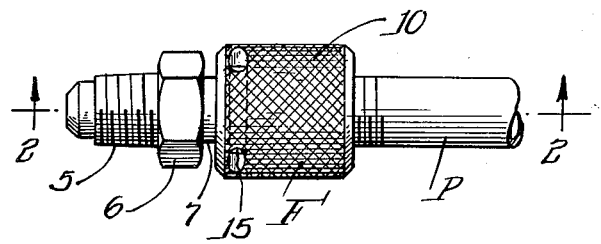
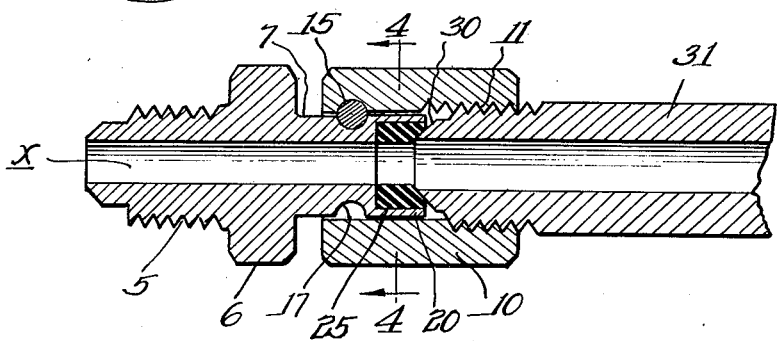
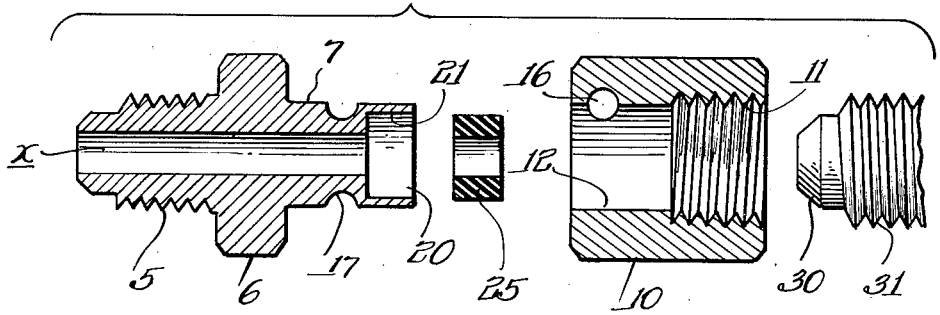
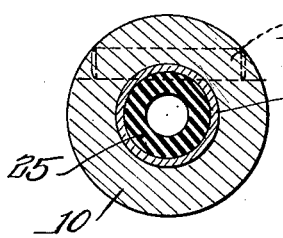
INVENTOR.
Albert Wittlin
BY
Banning & Banning
Attys.

Patented May 2, 1950

2,506,286

UNITED STATES PATENT OFFICE 2,506,286

MANUAL COUPLER

Albert Wittlin, Chicago, Ill.

Application October 25, 1947, Serial No. 782,088

3 Claims. (Cl. 285—120)

This invention relates to a manually-operable coupler for installation in a pipe line. It is advantageous in respect of simplicity of construction, the ease and speed with which it may be manually connected or disconnected, and the effectiveness with which it operates under difficult conditions such as varying pressures, temperatures, and chemical constituents of the confined fluids.

These various objects and advantages are realized by a coupler according to my invention of which a suggestive embodiment is illustrated in the accompanying drawing wherein—

Figure 1 is a view in elevation of the coupler, one end of which is shown as connected with a pipe;

Fig. 2 is a longitudinal section, taken on line 2—2 of Fig. 1;

Fig. 3 is a view similar to Fig. 2 showing the various parts of the coupler in separated relation; and Fig. 4 is a transverse section, taken on line 4—4 of Fig. 2.

One major part of the coupler shown in Figs. 1 and 2 comprises a threaded nipple 5 provided with a hexagonal head 6 beyond which is a cylindrical shank 7, a bore $x$ of uniform diameter being extended therethrough. The second major part of the coupler is a cylindrical nut 10, preferably knurled on the outside and formed interiorly with sunken threads 11 in one end region. The remaining interior surface 12 of the nut is cylindrical to fit with a fairly close tolerance over the shank 7. These two parts are rotatably connected together by a cylindrical pin 15 carried by the nut in a round hole 16 whose axis is tangential to the shank 7. A circumferential groove 17 is formed in the shank to accommodate half of the pin at the point of its intersection therewith, and by this means I lock the one part inseparably to the other while permitting rotation freely therebetween. The pin may be secured in the hole 16 as by a drive fit.

The shank end within the nut is enlarged to provide a socket 20 with surrounding walls 21 for closely receiving an annular washer 25 of resilient rubber-like material which is wholly confined therein. The exposed circular end of this washer is subject to engagement by the beveled end 30 of a component fitting such as a pipe 31 which is screwthreaded externally for coaction with the nut 10. The internal diameter of this pipe, and also that of the washer 25, may be substantially the same as that of the shank 7 and nipple 5, to avoid constrictions and reduce flow resistance.

In use, the nipple 5 will be connected to a desired unit in the fluid system. A pipe 31 will be fitted within the unit 10 which, when rotated, will advance the pipe to its final position. Turning of the nut may be accomplished entirely by hand, and any increasing resistance to rotation will be offered solely by the washer as it is compressed in response to advance of the beveled end of the pipe which engages the washer substantially inwardly of the surrounding walls 21. This washer, as already noted, is confined so that it cannot expand outwardly to engage with the surrounding nut, nor can it twist and become deformed so as to function poorly. The fit of the smooth face of the nut over the cylindrical surface of the shank is fairly close, yet substantially friction-free. This results in maintaining the exposed end of the washer in a plane which is always transverse to the axis of the nut and, in response to rotation thereof, of a straight and even draw of the component fitting, such as the pipe 31, toward the exposed washer end and during engagement thereof. As a consequence a uniform pressure will be exerted upon the washer over the circular area of contact, and the resistance which it offers will be even and uniform at every point so that a fluid-tight seal is assured.

Because of the ease with which the pipe may be connected to or disconnected from the nut, the fitting as a whole may aptly be termed a "quick coupler". No tools are ordinarily required in these operations. The connection thus made is not only strong and dependable, but it is fluid-tight and will, therefore, serve in many installations where varying conditions of pressure, temperature, or chemical constituents will ordinarily make for trouble.

I claim:

1. A manual coupler of the kind described in which is combined a nipple having a tubular cylindrical shank wherein is a circumferential groove half-round in cross section, the shank at one end being enlarged to provide an axial socket surrounded by a circular wall, a nut having an axial bore whose internal diameter is such that the nut fits closely over the cylindrical shank, the nut being formed transversely with a round opening having its axis substantially tangential to the shank, a pin tightly fitted within the opening to lie within the circumferential groove of the shank whereby to prevent endwise movement between the nut and shank while permitting free rotation therebetween, a washer fitted within the end socket of the shank to be wholly accommodated therewithin and confined against outward displacement by the surrounding circular wall, the axial opening through the washer being substantially the same as that within the shank, screw threads formed interiorly of the nut beyond the washer for engagement with the threaded end portion of a component fitting whose end is beveled for engagement with the end of the washer inwardly of the surrounding circular wall whereby, in response to turning of the nut, the beveled end of the fitting is advanced against the washer with increasing pressure, the washer being prevented by the surrounding circular wall from expanding outwardly of the confining socket therefor.

2. A manual coupler of the kind described in which is combined a nipple having a tubular shank enlarged at one end to form a socket with a circular surrounding wall, a washer fitted within the socket and accommodated wholly therewithin, the axial opening through the washer being substantially the same in diameter as the axial opening through the shank, a nut having cylindrical walls smooth on the interior in closely spaced relation to the exterior walls of the shank and adapted to be fitted in part thereover, the remainder of the nut extending beyond the shank being formed internally with screw threads, there being an opening extending transversely through the nut tangentially of the shank and also a circumferential groove formed in the shank in register with the opening in the nut, a pin secured within the nut opening and disposed within the shank groove at the point of intersection therebetween whereby to lock the nut against endwise movement relative to the shank while permitting free rotation therebetween, the interior threads of the nut being adapted for engagement with the threaded end portion of a component fitting whose end is inwardly beveled for engagement with the exposed end of the washer at a point wholly to the inside of the circular surrounding wall, the nut, when rotated, serving to draw the fitting toward the washer end with increasing pressure whereby to subject the washer to compression but without displacement from the socket wherein it is confined.

3. A manual coupler of the kind described in which is combined a nipple having a tubular shank enlarged at one end to form thereat an open-ended socket, closed at the bottom, and provided with a circular surrounding wall, a resilient compressible washer fitted within the socket, accommodated wholly therewithin, and confined against movement outwardly therefrom, the axial opening through the washer being substantially the same in diameter as the axial opening through the shank, a nut having cylindrical walls smooth on the interior in closely spaced relation to the exterior walls of the shank and adapted to be fitted in part thereover, the remainder of the nut extending beyond the shank being formed internally with screw threads, means for locking the nut against endwise movement relative to the shank, either direction, while permitting free rotation therebetween, the interior threads of the nut being adapted for engagement with the threaded end portion of a component fitting whose end is inwardly beveled for engagement with the exposed end of the washer at a point wholly to the inside of the circular surrounding wall, the nut, when rotated, serving to draw the fitting toward the washer end with increasing pressure whereby to subject the washer to compression but without displacement from the socket wherein it is confined.

ALBERT WITTLIN.

REFERENCES CITED

The following references are of record in the file of this patent:

UNITED STATES PATENTS

| Number | Name | Date |
| --- | --- | --- |
| 401,262 | Frisbie | Apr. 9, 1889 |
| 1,298,878 | Brown | Apr. 1, 1919 |